US012043773B2

(12) United States Patent
Kondo et al.

(10) Patent No.: US 12,043,773 B2
(45) Date of Patent: Jul. 23, 2024

(54) COATING LIQUID AND ARTICLE USING SAME

(71) Applicant: JNC CORPORATION, Tokyo (JP)

(72) Inventors: Kyoko Kondo, Chiba (JP); Akihiro Ezoe, Chiba (JP)

(73) Assignee: JNC CORPORATION, Tokyo (JP)

( * ) Notice: Subject to any disclaimer, the term of this patent is extended or adjusted under 35 U.S.C. 154(b) by 580 days.

(21) Appl. No.: 17/050,842

(22) PCT Filed: May 16, 2019

(86) PCT No.: PCT/JP2019/019522
§ 371 (c)(1),
(2) Date: Oct. 27, 2020

(87) PCT Pub. No.: WO2019/225476
PCT Pub. Date: Nov. 28, 2019

(65) Prior Publication Data
US 2021/0087434 A1 Mar. 25, 2021

(30) Foreign Application Priority Data

May 23, 2018 (JP) ................................ 2018-099077

(51) Int. Cl.
| | | |
|---|---|---|
| *C08F 230/08* | (2006.01) | |
| *C09D 5/00* | (2006.01) | |
| *C09D 7/45* | (2018.01) | |
| *C09D 183/10* | (2006.01) | |
| *C09J 7/29* | (2018.01) | |
| *C09J 7/38* | (2018.01) | |
| *C08F 283/12* | (2006.01) | |

(52) U.S. Cl.
CPC ............... *C09J 7/29* (2018.01); *C09D 5/00* (2013.01); *C09D 7/45* (2018.01); *C09D 183/10* (2013.01); *C09J 7/38* (2018.01); *C08F 230/08* (2013.01); *C08F 283/124* (2013.01); *C09J 2203/31* (2013.01); *C09J 2301/162* (2020.08); *C09J 2301/302* (2020.08); *C09J 2301/414* (2020.08); *C09J 2453/006* (2013.01); *C09J 2475/006* (2013.01)

(58) Field of Classification Search
CPC ........................ C08F 230/08; C08F 283/124
USPC ........................................................ 526/279
See application file for complete search history.

(56) References Cited

U.S. PATENT DOCUMENTS

| | | | | |
|---|---|---|---|---|
| 7,868,112 B2 * | 1/2011 | Oikawa | ........... | C08F 290/14 |
| | | | | 528/42 |
| 2017/0226385 A1 * | 8/2017 | Hiraki | ........... | C09J 133/04 |

FOREIGN PATENT DOCUMENTS

| | | | |
|---|---|---|---|
| JP | 2008539107 | | 11/2008 |
| JP | 2016020079 | | 2/2016 |
| TW | 201609416 | | 3/2016 |
| WO | 2015133535 | | 9/2015 |
| WO | 2016/010041 | * | 1/2016 |
| WO | 2016010041 | | 1/2016 |
| WO | 2016159023 | | 10/2016 |

OTHER PUBLICATIONS

"Office Action of Taiwan Counterpart Application", issued on Oct. 19, 2022, with English translation thereof, p. 1-p. 9.
"Office Action of China Counterpart Application" with English translation thereof, issued on Sep. 27, 2022, p. 1-p. 2.
Office Action of China Counterpart Application, with English translation thereof, issued on Apr. 18, 2022, pp. 1-7.
"International Search Report (Form PCT/ISA/210) of PCT/JP2019/019522," mailed on Jul. 16, 2019, with English translation thereof, pp. 1-4.
"Office Action of China Counterpart Application" with English translation thereof, issued on Nov. 3, 2021, p. 1-p. 18.

* cited by examiner

*Primary Examiner* — Margaret G Moore
(74) *Attorney, Agent, or Firm* — JCIPRNET

(57) ABSTRACT

[Problem] To provide a coating film which is capable of maintaining good water repellency and antifouling properties. [Solution] A photopolymerizable coating composition which contains, as photopolymerizable components, a urethane (meth)acrylate (component (a)) and a photopolymerizable (meth)acrylic compound (component (b)), and which is configured such that: from 1% by weight to 50% by weight (inclusive) of the component (a) and from 50% by weight to 99% by weight (inclusive) of the component (b) relative to the total amount of the photopolymerizable components are mixed; and the component (b) contains a photopolymerizable acrylic compound (component (b1)) which has a structural unit derived from a fluorosilsesquioxane derivative represented by formula (1), a reactive silicone (component (b2)) and a photopolymerizable acrylic compound (component (b3)) which has no urethane unit, no fluorine atom and no Si atom.

5 Claims, 1 Drawing Sheet

COATING LIQUID AND ARTICLE USING SAME

CROSS-REFERENCE TO RELATED APPLICATION

This application is a 371 application of an international PCT application serial no. PCT/JP2019/019522, filed on May 16, 2019, which claims the priority benefit of Japan application JP2018-099077, filed on May 23, 2018. The entirety of the above-mentioned patent application is hereby incorporated by reference herein and made a part of this specification.

TECHNICAL FIELD

The present invention relates to a coating liquid that can be used as a material of a top coating layer of various articles and particularly a laminated film such as a paint protection film.

BACKGROUND ART

A paint protection film (PPF) is a film-like product that is used for surface protection of an industrial product used outdoors. A basic structure of the PPF is a laminate that includes at least two layers including a substrate made of a flexible and transparent resin film and an adhesive layer. Thus, a PPF in the form of a laminated film that generally includes a coating layer for enhancing a stain-proofing function and scratch resistance of a substrate on a surface opposite to the adhesive layer of the substrate and further includes a release layer on a surface opposite to the substrate of the adhesive layer has been supplied to the market. When the PPF is used, first, the PPF is cut according to a surface part of an industrial product to be protected, and an adhesive layer of the cut PPF is brought into close contact with a protection target surface. A product whose surface is covered with a PPF is protected from various influences from the outside such as dirt and scratches due to wind and rain, dust, sand, river water, microorganisms and contact with or excretions of animals and plants and insects while a coating, shape, and appearance of the product are not impaired. Specifically, the PPF serves as a so-called cushion and buffers a pressure or strike from the outside, and the PPF repels rainwater and dirt. Therefore, effects of external influences on the product itself are minimized.

Initially, such a PPF was developed for industrial products used in a harsh environment such as an airplane, but it is becoming popular as a protection member of a surface of a body such as an automobile and a motorbike nowadays. For example, when a roof, hood, front, doors, and trunk door of an automobile are covered with a PPF, the body can be protected from bird feces, insect carcasses, cat footprints, malicious actions, scratches during transport, or scratches due to scattered stones which bother a driver. In general, when a surface covered with a PPF is washed with water, since it is possible to simply remove dirt on the surface of the PPF, the PPF can be used for a relatively long period. A PPF which has been used for a certain period can be separated from the body and simply replaced with a new PPF.

Due to the recent spread of vehicles such as automobiles and motorbikes worldwide, there is a demand for PPFs that can be used in a wider range of environments, for example, in more severe climates such as cold areas, tropical areas, and arid areas. Moreover, with the expansion of the PPF market, PPFs that can be appropriately applied by a worker without special skills more simply are desirable. Therefore, in recent PPFs, various aspects of performance such as flexibility for adaption to variable surface shapes of automobiles or motorbikes, durability to withstand influences from the outside for a long period, transparency and smoothness for preventing an appearance of the product itself from being impaired, and favorable detachability during replacement have been required.

As such a PPF, for example, in Patent Document 1, a PPF which has excellent sticking characteristics and in which there is less adhesive residue due to laminating a substrate film and an adhesive layer whose surface roughness is controlled is described. However, in this PPF, a detailed examination of a stain-proofing layer added to a surface of the substrate film was not performed, and there was a problem in practicality for automobiles and motorbikes whose appearances are considered to be important.

In addition, for example, in Patent Document 2, a PPF in which a first layer containing polyurethane, a second layer containing a thermoplastic polyurethane, and a third layer containing a pressure sensitive adhesive are laminated in that order is described. However, further improvement in various aspects of performance is also required for this PPF.

CITATION LIST

Patent Literature

[Patent Literature 1]
  Japanese Patent Laid-Open No. 2016-20079
[Patent Literature 2]
  Published Japanese Translation No. 2008-539107 of the PCT International Publication

SUMMARY OF INVENTION

Technical Problem

There is room for improvement in such prior PPF technology. In improving performance, the inventors have focused particularly on weathering resistance stability that has not been studied in the above prior technology, that is, maintaining initial stain-proofing and water-repelling properties even after use in a harsh outdoor environment for a long period. The inventors aimed at improvement of the weathering resistance stability by modifying a coating material constituting the outermost surface of a PPF.

Solution to Problem

As a result, the inventors found that an acrylic photopolymerizable coating composition containing two specific types of fluorine-containing photopolymerizable component provides a coating (coating layer) that exhibits long lasting stain-proofing and water-repelling properties. In addition, the inventors found that a coating layer formed of a cured product of the photopolymerizable coating composition can be used as a laminated film such as a PPF. Specifically, the present invention is as follows.

(Invention 1) A photopolymerizable coating composition, including: a component (a): a urethane (meth)acrylate and a component (b): photopolymerizable (meth)acrylic compounds, as photopolymerizable components, wherein the component (a) and the component (b) are mixed so that a proportion of the component (a) is 1% by weight or more and 50% by weight or less and a proportion of the component (b) is 50% by weight or more and 99% by weight or less with respect to a total amount of the photopolymerizable components, wherein the component (b) includes a component (b1): a photopolymerizable acrylic compound having a structural unit derived from a fluorosilsesquioxane derivative represented by the following Formula (1); a component (b2): a reactive silicone, and a component (b3): a photopolymerizable acrylic compound having no urethane unit and having neither fluorine atoms nor Si atoms:

[Chem. 1]

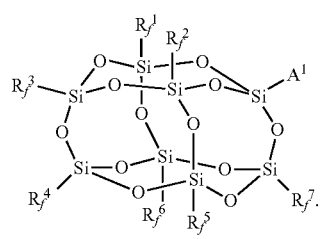
(1)

(in Formula (1), $R_f^1$ to $R_f^7$ each independently represent a linear or branched fluoroalkyl having 1 to 20 carbon atoms in which any methylene is optionally substituted with an oxygen atom; a fluoroaryl group having 6 to 20 carbon atoms in which at least one hydrogen atom is substituted with a fluorine atom or a trifluoromethyl group; or a fluoroarylalkyl group having 7 to 20 carbon atoms in which at least one hydrogen atom in an aryl group is substituted with a fluorine atom or a trifluoromethyl group, and $A^1$ is a group represented by the following Formula (1-1) or Formula (1-2))

[Chem. 2]

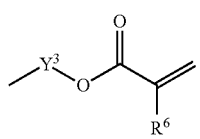
(1-1)

(in Formula (1-1), $Y^3$ represents an alkylene group having 2 to 10 carbon atoms, $R^6$ represents a hydrogen atom, a linear alkyl having 1 to 5 carbon atoms, a branched alkyl having 3 to 5 carbon atoms, or an aryl group having 6 to 10 carbon atoms)

[Chem. 3]

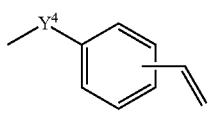
(1-2)

(in Formula (1-2), $Y^4$ represents a single bond or an alkylene group having 1 to 10 carbon atoms).

(Invention 2) The photopolymerizable coating composition according to Invention 1, wherein the component (b1) has a structural unit derived from γ-methacryloxypropyl-hepta(trifluoropropyl)-T8-silsesquioxane represented by the following Formula (1-3),

[Chem. 4]

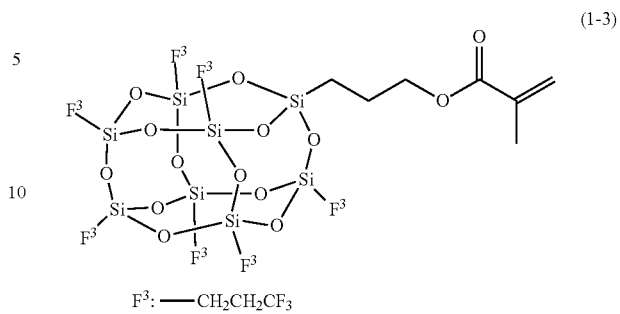
(1-3)

$F^3$: —$CH_2CH_2CF_3$ and,
wherein the component (b2) is a polyorganosiloxane compound having a vinyl group at its terminal.

(Invention 3) The photopolymerizable coating composition according to Invention 1, further including a component (c): a fluorine surfactant.

(Invention 4) An article having a coating layer formed of a cured product of the photopolymerizable coating composition according to any one of Invention 1 to Invention 3.

(Invention 5) A laminated film in which a coating layer formed of a cured product of the photopolymerizable coating composition according to any one of Invention 1 to Invention 3, a substrate layer formed of a thermoplastic polyurethane, an adhesive layer formed of a pressure sensitive adhesive, and a release layer whose surface is coated with a fluorine or silicone release agent are in contact in this order.

(Invention 6) A paint protection film using the laminated film according to Invention 5.

Advantageous Effects of Invention

Favorable stain-proofing and water-repelling properties of the coating (coating layer) obtained using the photopolymerizable coating composition of the present invention are maintained even after use outdoors for a long period.

DESCRIPTION OF EMBODIMENTS

[1. Photopolymerizable Coating Composition]

Figure 1:
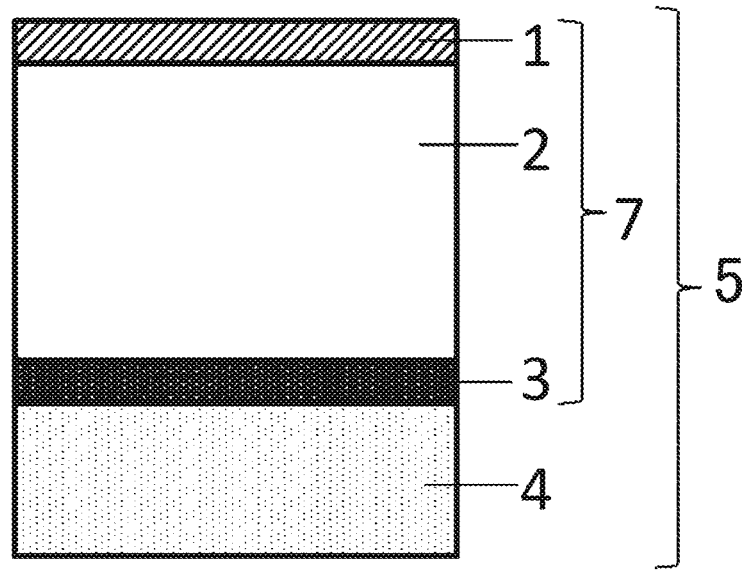
FIG. 1 is a diagram schematically showing one example of a laminated film of the present invention.

A light coating composition of the present invention contains, as photopolymerizable components serving as essential components, a component (a) to be described below: a urethane (meth)acrylate and a component (b) to be described below: photopolymerizable (meth)acrylic compounds. In the photopolymerizable coating composition of the present invention, the component (a) and the component (b) may be in a diluted state or in an undiluted polymer state.

In the present invention, the component (a) and the component (b) are mixed such that a proportion of the component (a) is 1% by weight or more and 50% by weight or less and a proportion of the component (b) is 50% by weight or more and 99% by weight or less, and preferably a proportion of the component (a) is 1% by weight or more and 30% by weight or less and a proportion of the component (b) is 70% by weight or more and 99% by weight or less with respect to a total amount of the photopolymerizable components.

[Component (a): Urethane (Meth)Acrylate]

The urethane (meth)acrylate used as the component (a) is a general term for an oligomeric compound which is obtained by a reaction of an isocyanate compound, a polyol, a hydroxyl group-containing (meth)acrylic monomer, and an isocyanate group-containing (meth)acrylic monomer, and which has a reactive (meth)acryloyl group at its terminal.

The urethane (meth)acrylate used in the present invention is typically a UV-curable urethane (meth)acrylate, and preferably, a urethane (meth)acrylate obtained by reacting (i) an isocyanate compound including an aliphatic isocyanate compound and/or an alicyclic isocyanate compound, at least one polyol compound selected from among (ii) an ester polyol, (iii) an ether polyol, (iv) polycarbonate polyols, and (v) a hydroxyl group-containing (meth)acrylate compound.

(i) Regarding the aliphatic isocyanate compound, for example, hexamethylene diisocyanate, an isocyanurate-modified product of hexamethylene diisocyanate, and trimethyl hexamethylene diisocyanate may be exemplified. Regarding the alicyclic isocyanate compound, for example, isophorone diisocyanate, 4,4'-dicyclohexylmethane isocyanate, and hydrogenated xylene diisocyanate may be exemplified.

(ii) Regarding the ester polyol, for example, an ester compound obtained by reacting diols with a dicarbonic acid may be exemplified. Regarding the diols, for example, 3-methyl-1,5-pentanediol, neopentyl glycol, ethylene glycol, diethylene glycol, propylene glycol, dipropylene glycol, 1,3-butanediol, 1,4-butanediol, 1,6-hexanediol, 2-methyl-1,8-octanediol, and 1,9-nonanediol may be exemplified. Regarding the dicarboxylic acid, sebacic acid, adipic acid, dimer acid, succinic acid, azelaic acid, maleic acid, terephthalic acid, isophthalic acid, and citraconic acid may be exemplified, and an anhydride thereof may be used.

(iii) Regarding the ether polyol, for example, polyether diol, poly(oxytetramethylene) glycol, and poly(oxybutylene) glycol may be exemplified. Regarding a specific example of the polyether diol, polypropylene glycol, polyethylene glycol, polytetramethylene glycol, and propylene-modified polytetramethylene glycol may be exemplified.

(iv) Regarding the polycarbonate polyol, for example, a reaction product of a carbonate derivative and diols may be exemplified. Regarding examples of carbonate derivatives, a diallyl carbonate such as diphenyl carbonate, dimethyl carbonate, and diethyl carbonate may be exemplified. In addition, regarding the diols, the above compounds may be exemplified.

(v) Regarding the acrylate compound having a hydroxyl group, 2-hydroxyethyl (meth)acrylate, 2-hydroxypropyl (meth)acrylate, 2-hydroxybutyl (meth)acrylate, 4-hydroxybutyl (meth)acrylate, polyethylene glycol mono(meth)acrylate, polypropylene glycol mono(meth)acrylate and the like may be exemplified.

In production of such a urethane acrylate, an isocyanate compound, a polyol compound, and an acrylate compound having a hydroxyl group which are essential components can be reacted in a collective manner. Alternatively, a (meth)acrylate compound having a hydroxyl group and such an isocyanate compound may be first reacted to prepare a prepolymer having excess isocyanate groups, and then residual isocyanate groups can be reacted with a polyol compound.

Alternatively, an isocyanate compound and a polyol compound may be first reacted to prepare a prepolymer having excess isocyanate groups, and then residual isocyanate groups can be reacted with a (meth)acrylate compound having a hydroxyl group. A urethane (meth)acrylate produced by such a method preferably has a polyurethane chain.

In the present invention, commercial products, such as Purple Light UT-5569 (commercially available from The Nippon Synthetic Chemical Industry Co., Ltd.), AUP-838 (commercially available from Tokushiki Co., Ltd.), RUA-0625, RUA-058SY2 (commercially available from Asia Industry Co., Ltd.), RUA-012, RUA-075 (commercially available from Asia Industry Co., Ltd.), and P7-532 (commercially available from Kyoeisha Chemical Co., Ltd.) can be used.

[Component (b): Photopolymerizable (Meth)Acrylic Compounds]

The photopolymerizable coating composition of the present invention contains a component (b): photopolymerizable (meth)acrylic compounds as a component that photocopolymerizes with the component (a). The component (b) contains a component (b1): a photopolymerizable acrylic compound having a structural unit derived from a fluorosilsesquioxane derivative represented by the following Formula (1), a component (b2): a reactive silicone, and a component (b3): a photopolymerizable acrylic compound having no urethane unit and having neither fluorine atoms nor Si atoms. The component (b1), the component (b2), and the component (b3) are mixed in a diluted state or in an undiluted polymer state.

The proportion of each of the component (b1), the component (b2), and the component (b3) in the component (b) is not particularly limited. Generally, respective components are blended in so that a total amount of the component (b1) and the component (b2) is 0.1% by weight or more and 10% by weight or less, and preferably 0.5% by weight or more and 5% by weight or less with respect to a total amount of the component (b). In addition, generally, based on the mass, the component (b2) is combined with 0.1 times or more and 10 times or less, and preferably 0.2 times or more and 5 times or less the amount of the component (b1). In the present invention, when the component (b2) is combined with the component (b1), a synergistic effect is obtained.

[Component (b1): Photopolymerizable Acrylic Compound Having a Structural Unit Derived from a Fluorosilsesquioxane Derivative]

The component (b1) contained in the component (b) of the present invention has a fluorosilsesquioxane structure and is generally classified into a random type structure, a ladder type, and a cage type structure according to an Si—O—Si skeleton thereof. Among these, a photopolymerizable (meth)acrylic compound having a structural unit derived from a fluorosilsesquioxane derivative represented by the following Formula (1) is particularly preferable.

[Chem. 5]

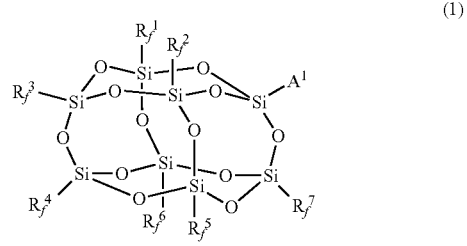

(1)

In Formula (1), $R_f^1$ to $R_f^7$ each independently represent a linear or branched fluoroalkyl having 1 to 20 carbon atoms in which any methylene is optionally substituted with an oxygen atom; a fluoroaryl group having 6 to 20 carbon atoms in which at least one hydrogen atom is substituted with a fluorine atom or a trifluoromethyl group; or a fluoroarylalkyl group having 7 to 20 carbon atoms in which at least one hydrogen atom in an aryl group is substituted with a fluorine atom or a trifluoromethyl group, and $A^1$ is a group represented by the following Formula (1-1) or Formula (1-2).

Preferably, in Formula (1), $R_f^1$ to $R_f^7$ each independently represent 3,3,3-trifluoropropyl, 3,3,4,4,4-pentafluorobutyl, 3,3,4,4,5,5,6,6,6-nonafluorohexyl, tridecafluoro-1,1,2,2-tetrahydrooctyl, heptadecafluoro-1,1,2,2-tetrahydrodecyl, henicosafluoro-1,1,2,2-tetrahydrododecyl, pentacosafluoro-1,1,2,2-tetrahydrotetradecyl, (3-heptafluoroisopropoxy)propyl, pentafluorophenylpropyl, pentafluorophenyl, or α,α,α-trifluoromethylphenyl.

More preferably, in Formula (1), $R_f^1$ to $R_f^7$ each independently represent 3,3,3-trifluoropropyl or 3,3,4,4,5,5,6,6,6-nonafluorohexyl.

[Chem. 6]

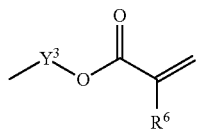

(1-1)

In Formula (1-1), $Y^3$ represents an alkylene group having 2 to 10 carbon atoms, and preferably an alkylene group having 2 to 6 carbon atoms, and $R^6$ represents a hydrogen atom, a linear or branched alkyl group having 1 to 5 carbon atoms, or an aryl group having 6 to 10 carbon atoms, and preferably represents a hydrogen atom or an alkyl group having 1 to 3 carbon atoms.

[Chem. 7]

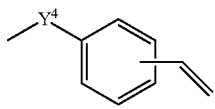

(1-2)

In Formula (1-2), $Y^4$ represents a single bond or an alkylene group having 1 to 10 carbon atoms.

The fluorosilsesquioxane derivative (1) is produced by the following method. First, when a silicon compound (2) having a trifunctional hydrolyzable group represented by the following Formula (2) is hydrolyzed and polycondensed in an oxygen-containing organic solvent in the presence of an alkali metal hydroxide, a compound (3) represented by the following Formula (3) is produced.

[Chem. 8]

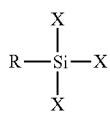

(2)

[Chem. 9]

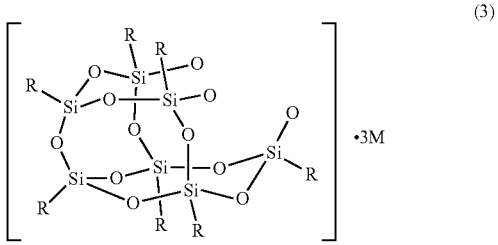

(3)

In Formula (3), M is not particularly limited as long as it is an alkali metal. As such an alkali metal, for example, lithium, sodium, potassium, and cesium, may be exemplified.

In Formulae (2) and (3), R is each independently correspond to one group selected from among $R_f^1$ to $R_f^7$ in Formula (1), and represent a linear or branched fluoroalkyl having 1 to 20 carbon atoms in which any methylene is optionally substituted with an oxygen atom; a fluoroaryl group having 6 to 20 carbon atoms in which at least one hydrogen atom is substituted with a fluorine atom or a trifluoromethyl group; or a fluoroarylalkyl group having 7 to 20 carbon atoms in which at least one hydrogen atom in an aryl group is substituted with a fluorine atom or a trifluoromethyl group, and X represents a hydrolyzable group.

Preferably, in Formulae (2) and (3), R is each independently represent 3,3,3-trifluoropropyl, 3,3,4,4,4-pentafluorobutyl, 3,3,4,4,5,5,6,6,6-nonafluorohexyl, tridecafluoro-1,1,2,2-tetrahydrooctyl, heptadecafluoro-1,1,2,2-tetrahydrodecyl, henicosafluoro-1,1,2,2-tetrahydrododecyl, pentacosafluoro-1,1,2,2-tetrahydrotetradecyl, (3-heptafluoroisopropoxy)propyl, pentafluorophenylpropyl, pentafluorophenyl, or α,α,α-trifluoromethylphenyl.

More preferably, in Formula (2), R is each independently represent 3,3,3-trifluoropropyl or 3,3,4,4,5,5,6,6,6-nonafluorohexyl.

Next, the compound (3) is reacted with a compound (4) represented by the following Formula (4) to obtain the fluorosilsesquioxane derivative (1).

[Chem. 10]

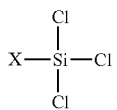

(4)

In Formula (4), the group X is a group represented by Formula (1-1) or Formula (1-2).

Among such fluorosilsesquioxane derivatives (1), γ-methacryloxypropylhepta(trifluoropropyl)-T8-silsesquioxane represented by the following Formula (5) is preferable.

[Chem. 11]

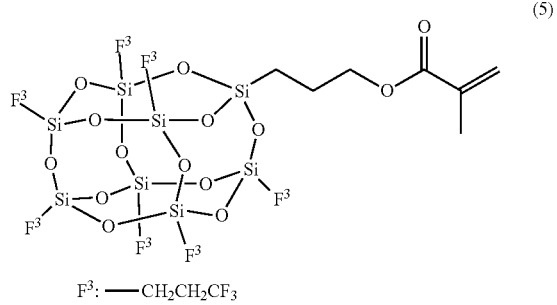

(5)

F³: —CH₂CH₂CF₃

When the fluorosilsesquioxane derivative (1) such as γ-methacryloxypropylhepta(trifluoropropyl)-T8-silsesquioxane is introduced into the coating layer, it is possible to further improve a stain-proofing function of the coating layer. When the fluorosilsesquioxane derivative (1) is contained in photopolymerizable (meth)acrylic compounds, it may be directly mixed with other photopolymerizable (meth)acrylic compounds or an oligomer prepared by cross linking and/or polymerizing this and photopolymerizable (meth)acrylic compounds in advance may be mixed with other photopolymerizable acrylic compounds.

Generally, the fluorosilsesquioxane derivative (1) is copolymerized with at least one (meth)acrylate copolymer component selected from among a monofunctional acrylate, a bifunctional acrylate, and a multifunctional acrylate to prepare a polymer having the fluorosilsesquioxane derivative (1) unit in advance, and this polymer is used as a part of photopolymerizable (meth)acrylic compounds. In this case, the polymer having the fluorosilsesquioxane derivative (1) unit is blended in in a proportion of 0.01 to 10 parts by weight, and preferably 0.05 to 5 parts by weight with respect to a total amount of the photopolymerization component.

As the at least one (meth)acrylate copolymer component, a compound that is generally referred to as a photocurable acrylic monomer, for example, a monofunctional acrylate such as (meth)acrylic acid, (meth)acrylic acid ester and a hydroxy group-containing (meth)acrylic acid ester, a bifunctional acrylate such as (poly)alkylene glycol di(meth)acrylate, and a trifunctional or higher functional acrylate such as pentaerythritol triacrylate, and additionally an oligomer obtained by polymerizing these can be used.

[Component (b2): Reactive Silicone]

The component (b2) contained in the component (b) of the present invention: reactive silicones are a group of silicone compounds, which are also called reactive silicone oils and polysiloxane macromonomers. In the field of polymer synthesis, these are used as raw materials for block copolymers and graft copolymers and a modifying material for molding resins and modifiers for paints. The component (b2) improves the surface smoothness of the photopolymerizable coating composition of the present invention.

Regarding the component (b2), a polyorganosiloxane compound having a vinyl group at its terminal is preferable, and a polydimethylsiloxane macromonomer having a methacryloyl group at its terminal is more preferable.

[Component (b3): Photopolymerizable Acrylic Compound Having No Urethane Unit and Having Neither Fluorine Atoms Nor Si Atoms]

In the photopolymerizable coating composition of the present invention, as a crosslinking agent or a copolymerizable monomer that is photopolymerized with at least one component of the above component (a), component (b1), and component (b2), a component (b3): photopolymerizable acrylic compound having no urethane unit and having neither fluorine atoms nor Si atoms is contained. The component (b3) contributes to extension of polymer chains in the curing of the photopolymerizable coating composition of the present invention. A resin component mainly containing the component (b3) contained in the curing contributes to the strength of the coating (coating layer) generated in the curing. The component (b3) is selected from among various compounds and products available as a photopolymerizable acrylic compound or a solution containing the same, and the types thereof are not limited.

A form of the component (b3) that is mixed with at least one selected from among the above component (a), component (b1), and component (b2) in advance can be supplied to the photopolymerizable coating composition of the present invention. A copolymer obtained by reacting at least a part of the component (b3) with at least one selected from among the above component (a), component (111), and component (b2) can be supplied to the photopolymerizable coating composition of the present invention.

[Component (c): Fluorine Surfactant]

The photopolymerizable coating composition of the present invention may further contain a component (c): a fluorine surfactant. The component (c) is a monomer or oligomer having a fluorine atom and a photopolymerizable unsaturated group in its chemical structure and refers to a material group called a fluorine additive, a fluorine surfactant or a fluorine surface modifier in the field of paints. In this specification, for convenience, the component (c) is referred to as a "fluorine surfactant" which is a general term.

Regarding the component (c), a nonionic component in which component separation does not occur in the photopolymerizable coating composition of the present invention and which is highly soluble in various organic solvents (for example, an ether solvent, an ester solvent, a ketone solvent, and an alcohol solvent) is preferable. In addition, a component (c) containing 0.01 to 80% by weight of fluorine is preferable.

Regarding a preferable component (c), a perfluoropolyether compound having a perfluoropolyether skeleton and having a photopolymerizable unsaturated group at one end or both ends can be used. The perfluoropolyether skeleton has a repeating structure of, for example, —(O—CF₂CF₂)—, —(OCF₂CF₂CF₂)—, or —(O—CF₂C(CF₃)F)—. The photopolymerizable unsaturated group is not particularly limited, and (meth)acryloyl, (meth)acryloyl oxy, vinyl, and allyl groups may be exemplified, and a (meth)acryloyl group is preferable in consideration of the reactivity with the component (a) and the component (b).

Regarding such a component (c), for example, "MEGAFACE (registered trademark) RS-75" (commercially available from DIC Corporation), "KY-1203" (commercially available from Shin-Etsu Chemical Co., Ltd.), "FLUOROLINK AD1700" and "FLUOROLINK MD700" (commercially available from Solvay Solexis Co., Ltd.), "OPTOOL DAC-HP" (commercially available from Daikin Chemicals Co., Ltd.), and "CN4000" (commercially available from Sartomer Corporation) can be used.

The photopolymerizable coating composition of the present invention may contain generally 0.1% by weight or more and 10% by weight or less, and preferably 0.5% by weight or more and 5% by weight or less of the component (c) with respect to a total amount of the photopolymerizable components.

[2. Polymerization Initiator]

Regarding a polymerization initiator used for curing the photopolymerizable coating composition of the present invention, those distributed as photopolymerization initiators can be used without limitation. For such a photopolymerization initiator, for example, a hydroxyketone polymer such as {2-hydroxy-2-methyl-1-phenylpropanone}, 1-hydroxydicyclohexyl phenylketone, 2-hydroxy-2-methyl-1-phenylpropan-1-one, 2,2-dimethoxy-1,2-diphenylethane-1-one, 1-{4 (2-hydroxyethoxy)phenyl}2-hydroxy-2-methyl-1-propane 1-one, 2,4,6-trimethylbenzoyl diphenyl phosphine oxide, and bis(2,4,6 trimethylbenzoyl)phenylphosphine oxide can be used.

[3. Additives]

Additives such as an antioxidant, a weathering resistance stabilizer, a toning agent, and a diluent that are generally blended into a paint or film material can be blended into the photopolymerizable coating composition of the present invention. Blending amounts thereof are not limited as long as the function of the photopolymerizable coating composition of the present invention does not deteriorate.

[4. Use of Photopolymerizable Coating Composition]

The photopolymerizable coating composition of the present invention can be applied to the surface of various articles and cured and dried to form a coating (coating layer) that imparts stain-proofing and water-repelling functions on the surface of the article. While the article on which the coating layer can be formed is not particularly limited, particularly, a laminated film is advantageous in that the liquid photopolymerizable coating composition of the present invention can be simply applied. Among laminated films, a PPF for which stain-proofing and water-repelling functions are required is particularly useful as an article using the coating layer.

Hereinafter, a laminated film in which the coating layer is provided will be described below in detail.

[Coating Layer]

The coating layer constituting the laminated film of the present invention includes a polymer obtained by curing the above photopolymerizable coating composition on a substrate layer in the presence of a polymerization initiator. The thickness of the coating layer is generally 1 to 100 μm, preferably 2 to 50 μm, and more preferably 3 to 30 μm. The structure of the polymer constituting such a coating layer is complicated and cannot be expressed by a single repeating unit or a uniform structural formula. In the present invention, the polymer constituting the coating layer is defined by a photopolymerizable compound contained in the photopolymerizable coating composition.

[Substrate Layer]

Regarding the substrate layer constituting the laminated film of the present invention, a film formed of a thermoplastic resin is preferably used. Examples of thermoplastic resins include resins such as a polyurethane resin, a polyester resin, an acetate resin, a polyether sulfone resin, a polycarbonate resin, a polyamide resin, a polyimide resin, a polyolefin resin, a (meth)acrylic resin, a polyvinyl chloride resin, a polyvinylidene chloride resin, a polystyrene resin, a polyvinyl alcohol resin, a polyarylate resin, a polyphenylene sulfide resin, and a norbornene resin. Specifically, a thermoplastic polyurethane, polycaprolactone (PCL), an acrylic acid polymer, a polyester, a polyacrylonitrile, a polyether ketone, a polystyrene, a polyvinyl acetate, and derivatives thereof are preferable. These resins may be used alone or a plurality of resins may be used in combination.

A particularly preferable substrate layer includes a thermoplastic polyurethane. Examples of thermoplastic polyurethanes include ArgoGuard (registered trademark) 49510 and ArgoGuard (registered trademark) 49510-DV (commercially available from SWM Co., Ltd.), Esmer URSPX86, Esmer URSPX93, and Esmer URSPX98 (commercially available from Nihon Matai Co., Ltd.), DUS202, DUS213, DUS235, DUS501, DUS601, DUS605, DUS614, DUS203, DUS220, DUS701, XUS2086, XUS2098, DUS451, and DUS450 (commercially available from Sheedom Co., Ltd.), and Unigrand XN2001, XN2002, and XN2004 (commercially available from Nippon Unipolymer Co., Ltd.). Among these, a polycaprolactone thermoplastic polyurethane using a polycaprolactone polyol as a polyhydroxy compound, a polycarbonate thermoplastic polyurethane using a polycarbonate polyol, and a polyether thermoplastic polyurethane using a polyether polyol are preferable.

In the present invention, the thickness of the substrate layer is not particularly limited, and is generally 25 to 300 μm, and preferably 100 to 200 μm.

[Adhesive Layer]

The adhesive layer constituting the laminated film of the present invention includes a pressure sensitive adhesive. Regarding the pressure sensitive adhesive used in the present invention, a known adhesive which exhibits adhesiveness at a PPF application temperature, that is, at a temperature of about 20 to about 30° C., and which is used for adhering a molded article formed of a thermoplastic polyurethane material to an article made of glass, a metal, a plastic, or paper can be used without limitation. Regarding such a pressure sensitive adhesive, a commercially available acrylic pressure sensitive adhesive and urethane pressure sensitive adhesive can be used. Preferably, an acrylic pressure sensitive adhesive is used. The thickness of the adhesive layer is not particularly limited and is generally about 10 to 200 μm.

[Release Layer]

Preferably, a release layer is additionally laminated on the adhesive layer constituting the laminated film of the present invention. Regarding the material of the release layer, a known release material is used without limitation. For example, a resin film such as a polyester resin and a polyolefin resin, a cellophane paper, a glassine paper, or those of which surfaces are coated with a fluorine or silicone release agent can be used. The thickness of the release layer is not particularly limited, and generally about 20 to 200 μm.

[Protective Layer]

In the laminated film of the present invention, the outer surface of the coating layer can be covered with a protective layer depending on the form of storage, transportation, and sale. The material of such a protective layer is not limited and a generally used plastic film such as a polyethylene film or release paper can be appropriately selected.

[Production of Laminated Film]

Regarding a method of producing a laminated film of the present invention, a method suitable for formation and lamination of respective layers can be used without limitation. For example, when the laminated film of the present invention has a release layer and a protective layer, the laminated film of the present invention can be produced through the following processes.

First, an adhesive layer is formed on the release-treated surface of the release layer. Then, the opened surface of the formed adhesive layer is brought into close contact with one surface of the substrate layer and a laminate in which the substrate layer, the adhesive layer, and the release layer are in contact in this order is produced. Next, the above photopolymerizable coating composition is applied to the released surface of the substrate layer of the obtained laminate, and UV rays are emitted to the coating surface to cure the photopolymerizable coating composition. When curing is completed, a laminated film in which the coating layer, the substrate layer, the adhesive layer, and the release layer are in contact in this order is obtained. In addition, the open surface of the coating layer is covered with a protective film. Therefore, a laminated film in which the protective layer, the coating layer, the substrate layer, the adhesive layer, and the release layer are in contact in this order is obtained. The obtained laminated film can be appropriately cut, wound, and packaged.

[PPF]

The laminated film of the present invention completed in this manner can be cut into an appropriate length unit, loaded or wound and used as a PPF. When the PPF is applied, the laminated film of the present invention is cut into a shape conforming to the shape and size of a coated surface, the cut laminated film is stretched with an appropriate force, and the adhesive layer is brought into close contact with the coated surface.

In the laminated film of the present invention, the coating layer having excellent strength, smoothness, water repellency, and oil repellency has a function of mitigating external influences on the working surface. On the other hand, the flexible substrate layer is brought into close contact with the coated surface via the adhesive layer. After being used for a certain period, the laminated film can be removed without damage to the surface of the coated surface.

EXAMPLES

[Production of a Polymer Having a γ-Methacryloxypropyl-hepta(Trifluoropropyl)-T8-Silsesquioxane Unit as an Example of the Component (111)]

First, in the following procedure, γ-methacryloxypropyl-hepta(trifluoropropyl)-T8-silsesquioxane was synthesized. Trifluoropropyltrimethoxysilane (100 g), THF (500 mL), deionized water (10.5 g) and sodium hydroxide (7.9 g) were put into a 4-neck flask with an inner volume of 1 L to which a reflux condenser, a thermometer and a dropping funnel were attached, and while stirring using a magnetic stirrer, heating was performed in an oil bath from room temperature until the temperature reached a temperature at which THF was refluxing. Stirring was continued for 5 hours from when the refluxing started and a reaction was completed. Then, the flask was removed from the oil bath, was left at room temperature overnight, and then set again in the oil bath, and heating and concentration were performed under a constant pressure until a solid was precipitated.

The precipitated product was filtered using a pressure filter including a membrane filter with a pore size of 0.5 μm. Next, the obtained solid material was washed once with THF and dried at 80° C. for 3 hours using a reduced-pressure drying device, and 74 g of a colorless solid material powder was obtained.

The obtained solid material (65 g), dichloromethane (491 g), and triethylamine (8.1 g) were put into a 4-neck flask with an internal volume of 1 L to which a reflux condenser, a thermometer and a dropping funnel were attached, and cooling was performed to 3° C. in an ice bath. Next, γ-methacryloxypropyltrichlorosilane (21.2 g) was added thereto, and after it was confirmed that heat generation had subsided, removal from the ice bath was performed, and aging was performed at room temperature overnight without change. After washing with deionized water was performed three times, a dichloromethane layer was dehydrated with anhydrous magnesium sulfate, and magnesium sulfate was removed by filtration. Concentration was performed in a rotary evaporator until a viscous solid was precipitated, and 260 g of methanol was added and stirring was performed until a powder was formed. The powder was filtered using a pressure filter having a filter paper of 5 μm, and dried using a reduced pressure dryer at 65° C. for 3 hours, and 41.5 g of a colorless solid powder was obtained. The obtained solid was subjected to GPC, and $^1$H-NMR measurement, and generation of the γ-methacryloxypropylhepta(trifluoropropyl)-T8-silsesquioxane (5) represented by the following Expression (5) was confirmed.

[Chem. 12]

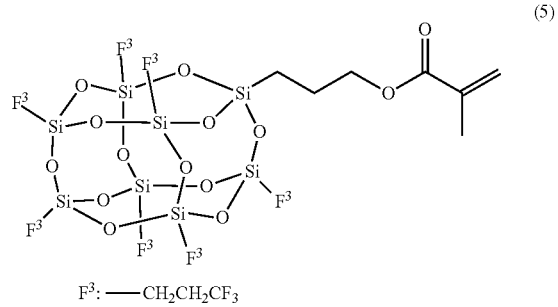

(5)

$F^3$: ——$CH_2CH_2CF_3$

Next, in the following procedure, a polymer having a γ-methacryloxypropylhepta(trifluoropropyl)-T8-silsesquioxane unit was synthesized.

The compound 5 (25 g), Silaplane FM0721 (6.3 g, commercially available from JNC Corporation), 2-hydroxylethyl methacrylate (18.8 g), methyl methacrylate (12.5 g), and methyl ethyl ketone (62 g) were put into a four-neck round-bottom flask to which a reflux device and a dropping funnel were attached and which was sealed with a nitrogen seal, and refluxing and degassing were performed for 15 minutes using an oil bath. Then, a solution in which azobisisobutyronitrile (0.48 g) and mercaptoacetic acid (0.054 g) were dissolved in methyl ethyl ketone (4.8 g) was added to initiate polymerization. A solution of a copolymer obtained when, 3 hours after the polymerization was initiated, azobisisobutyronitrile (0.48 g) was dissolved in methyl ethyl ketone (4.3 g) and added, and aged for 5 hours was obtained. Moreover, as a polymerization inhibitor, paramethoxyphenol (0.16 g), and dibutyltin dilaurate (0.15 g, commercially available from Showa Denko Co., Ltd.) were dissolved in methyl ethyl ketone (1.5 g) and added thereto. Then, Karenz AOI (26.4 g) was added dropwise using a dropping funnel so that the temperature of the solution was changed from 35° C. to 50° C., and after the dropwise addition, aging was performed at 45° C. for 3 hours.

Then, methanol (9 g) was added and treated and then paramethoxyphenol (0.16 g) was additionally added, and the mixture was diluted with methyl isobutyl ketone (107.3 g), and thereby a solution containing 30% by weight of a desired polymer (A-1) was obtained.

The obtained polymer (A-1) had a weight average molecular weight (Mw) of 42,000 and a polydispersity index (Mw/Mn) of 1.9. The weight average molecular weight and the polydispersity index were measured through gel permeation chromatography (GPC, model number: Alliance 2695, commercially available from Waters Co., Ltd., column: Shodex GPC KF-804Lx2 (in series), guard column: KF-G). According to GPC analysis, it was confirmed that the obtained polymer (A-1) was a polymer containing a γ-methacryloxypropylhepta(trifluoropropyl)-T8-silsesquioxane unit and having an acryloyl group in a side chain.

[Production of Photopolymerizable Coating Composition]

Materials in the compositions shown in Table 1 were mixed and stirred to produce photopolymerizable coating compositions of the present invention and photopolymerizable coating compositions for comparison. The materials used are shown below. (Component (a))

P7-532: urethane acrylate product (commercially available from Kyoeisha Chemical Co., Ltd.) (Component (b1))

XUA008: The polymer (A-1) produced by the above method. A polymer containing a γ-methacryloxypropylhepta(trifluoropropyl)-T8-silsesquioxane unit and having an acryloyl group in a side chain.

(Component (b2))

FM7711: product Silaplane (registered trademark, commercially available from JNC Corporation). A polydimethylsiloxane macromonomer having an average number molecular weight of 1,000 and a methacryloxy group at both terminals FM7725: product Silaplane (registered trademark, commercially available from JNC Corporation). A polydimethylsiloxane macromonomer having an average number molecular weight of 10,000 and a methacryloxy group at both terminals (Component (b3))

M309: product Aronix (registered trademark, commercially available from Toagosei Co., Ltd.) Trimethylolpropane triacrylate.

DPCA-120: product KAYARAD (commercially available from Nippon Kayaku Co., Ltd.) Caprolactone modified dipentaerythritol hexaacrylate.

A-HD-N: product (commercially available from Shin Nakamura Chemical Co., Ltd.) 1,6-Hexanediol diacrylate.

(Component (c))

RS-75: fluorine additive MEGAFACE (registered trademark, commercially available from DIC). A fluorine-containing group, hydrophilic group, lipophilic group, and UV reactive group-containing oligomer.

(Other Components)

Irgacure 127 (not listed in Table 1): photopolymerization initiator product commercially available from BASF. This was added at 7% by weight with respect to a total amount of the photopolymerizable coating composition.

[Production of Laminated Film]

A thermoplastic polyurethane film "ArgoGuard (registered trademark) 49510" commercially available from SWM (with a thickness of about 152 μm) was used as a substrate layer.

Separately, a commercially available acrylic pressure sensitive adhesive was applied to a release layer subjected to a release treatment with a silicone resin, and dried at 120° C. for 5 minutes. Thus, an adhesive layer with a thickness of 40 μm was formed on one surface of the release layer.

Next, an open surface of the adhesive layer and the substrate layer were press-bonded using a rubber roller and aged at 45° C. for 1 day. Thus, a laminated film in which the substrate layer, the adhesive layer, and the release layer were in contact in this order was obtained.

The photopolymerizable coating composition produced using the above material was applied to the open surface of the substrate layer using a wire bar and dried at 80° C. for 3 minutes. Then, the photopolymerizable coating composition was cured using a fusion UV lamp mounted belt conveyor curing unit (commercially available from Heraeus Co., Ltd.) at a cumulative light amount of 500 mJ/cm$^2$. A coating layer with a thickness of 4 μm was formed on the substrate layer. A laminated film 5 in which the coating layer 1, the substrate layer 2, the adhesive layer 3, and the release layer 4 were in contact in this order was obtained (see FIG. 1).

[Evaluation of Laminated Film]

(1) Water Contact Angle (Water-Repelling Properties)

1.8 μl of distilled water was added dropwise to the surface of the coating layer of the laminate, and an angle (water contact angle) formed between distilled water droplets and the surface of the coating layer of the laminate was measured. A contact angle meter Drop Master 400 (commercially available from Kyowa Interface Science, Inc.) was used as a measurement device. The measured value was evaluated according to the following criteria. The results are shown in Table 1.

A: The water contact angle was 100 degrees or more. Water-repelling properties were favorable.

B: The water contact angle was less than 100 degrees. Water-repelling properties were poor.

(2) Coefficient of Friction (Sliding Properties)

A coefficient of static friction and a coefficient of dynamic friction on the surface of the coating layer of the laminate were measured. HEIDON Type 14W (commercially available from Shinto Scientific Co., Ltd.) was used as a measurement device. The friction conditions were as follows: an indenter diameter of 11 mm, a load of 200 g, speed of 300 mm/min, and a one-way movement of 50 mm. The results are shown in Table 1.

(3) Squeegee Sliding Properties (Workability)

A 40 mm×130 mm piece was cut out from the laminated film, the release layer was removed, and a laminated film in which the coating layer, the substrate layer, and the adhesive layer were in contact in this order was prepared. Separately, an aluminum plate (a width of 50 mm, a length of 150 mm, and a thickness of 1.2 mm) to which a black paint for automobiles were applied was prepared.

Figure 2:
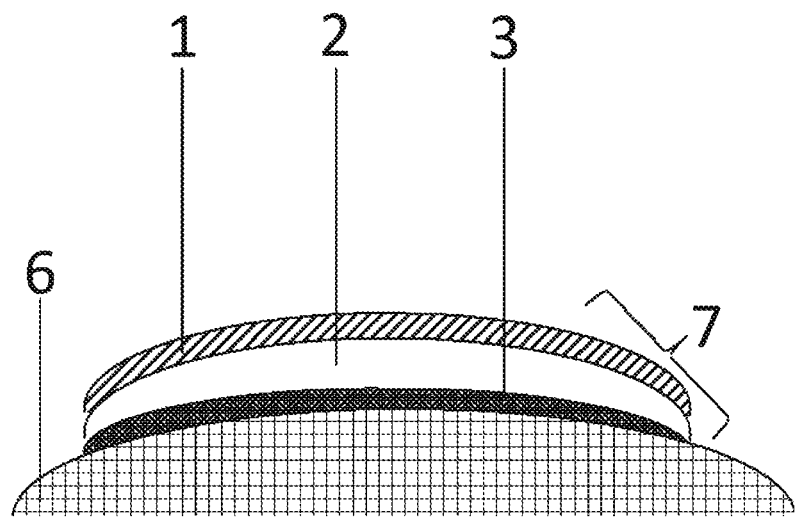
FIG. 2 is a diagram schematically showing a state in which the laminated film of the present invention is used as a PPF.

Water (here, a baby shampoo (commercially available from Johnson & Johnson K.K.) was diluted by a factor of 10,000 on a volume basis) was sprayed to the surface of the adhesive layer of the laminated film and a coated surface 6 of the coated plate (see FIG. 2). Then, the surface of the adhesive layer of the laminated film was brought into contact with the coated surface, the laminated film was pressed using a commercial rubber squeegee while air bubbles and water bubbles generated between the laminated film and the coated surface were removed, and the laminated film was attached to the coated plate. Sliding properties (squeegee sliding properties) of the laminated film in this case were determined according to the following criteria. The results are shown in Table 1.

"+": The squeegee slipped on the surface of the laminated film and the laminated film was attached without difficulty.

"−": The squeegee was caught on the surface of the laminated film, or an uneven resistance force was applied to the squeegee, which hindered attachment of the laminated film.

TABLE 1

| | | | | Example | | | | | | Comparative Example | | | |
|---|---|---|---|---|---|---|---|---|---|---|---|---|---|
| | | | | 1 | 2 | 3 | 4 | 5 | 6 | 1 | 2 | 3 | 4 |
| Photopolymerizable coating composition | (a) | P7-532 | (wt %) | 14.70 | 14.70 | 14.70 | 4.90 | 4.90 | 4.90 | 4.90 | 4.90 | 4.90 | 4.90 |
| | (b1) | XUA008 | (wt %) | 1.60 | 0.80 | 0.80 | 0.80 | 0.80 | 0.80 | | | 1.60 | |
| | (b2) | FM7711 | (wt %) | | 0.10 | | 1.00 | 0.10 | | 1.00 | | | |
| | | FM7725 | (wt %) | 0.10 | | 0.10 | | | 1.00 | | 1.00 | | |
| | (b3) | M309 | (wt %) | 78.70 | 73.90 | 73.90 | 88.60 | 88.60 | 88.60 | 88.60 | 88.60 | 88.60 | 88.60 |
| | | DPCA-120 | (wt %) | 4.90 | 4.90 | 4.90 | | | | | | | |
| | | A-HD-N | (wt %) | | 4.80 | 4.80 | 3.90 | 4.80 | 3.90 | 3.90 | 3.90 | 4.90 | 4.90 |
| | (c) | RS-75 | (wt %) | | 0.80 | 0.80 | 0.80 | 0.80 | 0.80 | | | | 1.60 |
| Evaluation | | Water contact angle | (degree) | 102 | 107 | 107 | 105 | 105 | 106 | 99 | 101 | 100 | 107 |
| | | Evaluation | | A | A | A | A | A | A | B | A | A | A |
| | | Coefficient of static friction | | 0.03 | 0.05 | 0.05 | 0.05 | 0.05 | 0.04 | 0.05 | 0.03 | 0.08 | 0.13 |
| | | Coefficient of dynamic friction | | 0.03 | 0.04 | 0.05 | 0.05 | 0.05 | 0.03 | 0.05 | 0.03 | 0.06 | 0.12 |
| | | Workability (determination) | | + | + | + | + | + | + | − | − | − | − |

As shown in the results in Table 1, in the laminated film in which a coating layer was formed using the photopolymerizable coating composition of the present invention, favorable water-repelling properties, sliding properties and workability were obtained. In particular, in the photopolymerizable coating composition of the present invention containing the component (c) in addition to the component (a) and the component (b), extremely favorable water-repelling properties, sliding properties, and workability were obtained. On the other hand, in the laminated film of the comparative example containing neither the component (b1) nor the component (b2) of the present invention, water-repelling properties and workability were poor.

INDUSTRIAL APPLICABILITY

The photopolymerizable coating composition of the present invention is highly useful as a water-repelling and stain-proofing coating material. The laminated film having a coating layer using the photopolymerizable coating composition of the present invention is highly useful as a PPF 7. Objects to which the PPF made of the laminated film of the present invention can be applied, can be expected to be a wide range of objects such as ships, buildings, electronic products, display products, interior finishings, furniture, factory facilities, industrial devices, and medical devices in addition to vehicles such as automobiles and motorbikes.

The invention claimed is:
1. A photopolymerizable coating composition, comprising:
  a component (a), a component (b1), a component (b2) and a component (b3), as photopolymerizable components,
    wherein the component (a), the component (b1), the component (b2) and the component (b3) are mixed so that a proportion of the component (a) is 1% by weight or more and 50% by weight or less and a proportion of a sum of the component (b1), the component (b2) and the component (b3) is 50% by weight or more and 99% by weight or less with respect to a total amount of the photopolymerizable components,
    wherein each component is mixed and stirred to produce the photopolymerizable coating composition, the component (a) is a urethane (meth)acrylate,
the component (b1) is a polymer obtained by copolymerizing a fluorosilsesquioxane derivative represented by the following Formula (1) and a (meth)acrylate copolymer component,
the component (b2) is a polyorganosiloxane compound having a vinyl group at both terminals, and
the component (b3) is a photopolymerizable acrylic compound having no urethane unit and having neither fluorine atoms nor Si atoms:

[Chem. 1]

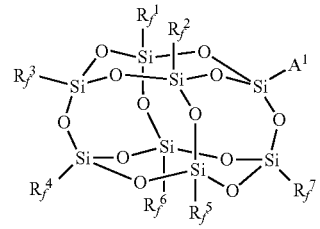

(1)

(in Formula (1), $Rr^1$ to $Rr^7$ each independently represent a linear or branched fluoroalkyl having 1 to 20 carbon atoms in which any methylene is optionally substituted with an oxygen atom; a fluoroaryl group having 6 to 20 carbon atoms in which at least one hydrogen atom is substituted with a fluorine atom or a trifluoromethyl group; or a fluoroarylalkyl group having 7 to 20 carbon atoms in which at least one hydrogen atom in an aryl group is substituted with a fluorine atom or a trifluoromethyl group, and $A^1$ is a group represented by the following Formula (1-1) or Formula (1-2))

[Chem. 2]

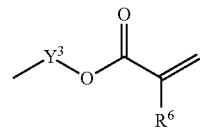

(1-1)

(in Formula (1-1), $Y^3$ represents an alkylene group having 2 to 10 carbon atoms, $R^6$ represents a hydrogen atom, a linear alkyl having 1 to 5 carbon atoms, a branched alkyl having 3 to 5 carbon atoms, or an aryl group having 6 to 10 carbon atoms)

[Chem. 3]

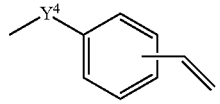

(1-2)

(in Formula (1-2), $Y^4$ represents a single bond or an alkylene group having 1 to 10 carbon atoms).

2. The photopolymerizable coating composition according to claim 1,
wherein the fluorosilsesquioxane derivative is y-methacryloxypropylhepta(trifluoropropyl)-T8-silsesquioxane represented by the following Formula (1-3),

[Chem. 4]

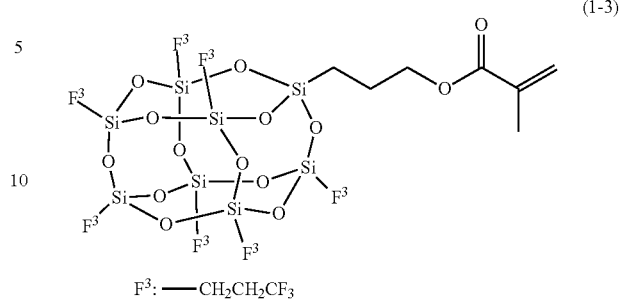

(1-3)

$F^3$: —$CH_2CH_2CF_3$ and,
wherein the component (b2) is a polydimethylsiloxane macromonomer having a methacryloxy group at both terminals.

3. The photopolymerizable coating composition according to claim 1, further comprising
a component (c): a fluorine surfactant.

4. An article having a coating layer formed of a cured product of the photopolymerizable coating composition according to claim 1.

5. A laminated film in which a coating layer formed of a cured product of the photopolymerizable coating composition according to claim 1, a substrate layer formed of a thermoplastic polyurethane, and an adhesive layer formed of a pressure sensitive adhesive are in contact in this order.

* * * * *